United States Patent
Brinkman

(10) Patent No.: US 9,058,160 B2
(45) Date of Patent: Jun. 16, 2015

(54) METHOD AND APPARATUS FOR DEPENDENCY TRACKING IN JAVASCRIPT

(75) Inventor: John P. Brinkman, Ottawa (CA)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 295 days.

(21) Appl. No.: 13/405,786

(22) Filed: Feb. 27, 2012

(65) Prior Publication Data
US 2013/0227527 A1 Aug. 29, 2013

(51) Int. Cl.
*G06F 9/44* (2006.01)
(52) U.S. Cl.
CPC ............. *G06F 8/24* (2013.01); *G06F 9/4428* (2013.01)
(58) Field of Classification Search
CPC .......................... G06F 9/45529; G06F 9/455
USPC .................................................. 717/115, 116
See application file for complete search history.

(56) References Cited

U.S. PATENT DOCUMENTS

| | | | |
|---|---|---|---|
| 6,473,769 B1* | 10/2002 | Andrew et al. | 707/610 |
| 7,065,752 B2* | 6/2006 | Willard | 717/140 |
| 2002/0170042 A1* | 11/2002 | Do et al. | 717/143 |

OTHER PUBLICATIONS

"Knockout", learn to build single-page applications, custom bindings and more, downloaded on May 22, 2012 from website: http://knockoutjs.com/ 2 pages.
"Grid-ObservableData", Observable Arrays and ObservableObjects, jQuery UI Development & Planing Wiki, downloaded on May 22, 2012, from website: http://wiki.jqueryui.com/w/page/39761893/Grid-ObservableData 6 pages.

* cited by examiner

*Primary Examiner* — Hang Pan
(74) *Attorney, Agent, or Firm* — Keller Jolley Preece

(57) ABSTRACT

A method and apparatus for dependency tracking in a JavaScript is disclosed. The method comprises defining a plurality of properties as JavaScript property objects, evaluating at least one expression containing at least one property object in the plurality of property objects to define at least one dependent property, notifying the at least one dependent property when a state of the property object changes, and updating the state of the at least one dependent property based on the changed state of the property object.

16 Claims, 4 Drawing Sheets

METHOD AND APPARATUS FOR DEPENDENCY TRACKING IN JAVASCRIPT

BACKGROUND OF THE INVENTION

1. Field of the Invention

Embodiments of the present invention generally relate to scripting programming languages and, more particularly, to a method and apparatus for dependency tracking in JavaScript.

2. Description of the Related Art

Javascript is a scripting language for creating web pages with dynamic functionality for use in writing relatively simple applications such as web forms. Forms are used to pass data to a server. A form can contain input elements such as text fields, check boxes, radio-buttons, submit buttons and the like. Online shopping is an example of a form experience. There exist multiple form fields for an online shopping cart. For example, it may contain input elements for a plurality of sale items such as a quantity field for each item. It also typically contains a radio-button for selecting a desired shipping method. In addition to these input fields, the shopping cart form contains calculated fields such as subtotal, tax, shipping charge, and grand total. A change in the quantity of an item results in a change to the subtotal of an order, which results in a change to the tax, shipping and grand total. The subtotal is said to depend from the quantity, while the tax, shipping and grand total are said to depend from the subtotal. When an input field, such as quantity or shipping method is changed, ideally, all calculated fields that depend on the changed input field update automatically. For this to happen, the calculated fields must know on what input fields they depend. Each calculated field must know when one of the input fields from which it depends is changed, so the value of the field can be recalculated.

A number of methods currently exist to ensure that the dependent fields are correctly recalculated. In one such method, any time any input field is changed, all quantities within the form are recalculated. This however creates performance issues due to unnecessary recalculating of unaffected fields. In another method, when a quantity is first calculated, every object that was referenced during the calculation is noted and stored. When the object updates, the object sends out a notification that the value of the object has updated. This is called an observer pattern. The recalculated object, referred to as a dependent object knows what it is dependent on and establishes a listening relationship with the object from which it depends. The dependent object listens for updates and if the dependent object sees a change in the object from which it depends, the dependent object recalculates itself. However, such tracking algorithms impose awkward syntax on the expression grammar which is used to track these dependencies. Conventional tracking algorithms use function accessors for all properties, for example this.price( )*this.quantity( ). These complicated expressions are difficult for a novice forms author who is familiar with expressing calculated fields using simple expressions such as price*quantity and who wants changes in input fields to be automatically reflected in dependent calculated fields.

Therefore, there is a need for an improved method and apparatus for dependency tracking in JavaScript.

SUMMARY OF THE INVENTION

Embodiments of the present invention generally relate to a method and apparatus for dependency tracking in JavaScript. The method comprises defining a plurality of properties as JavaScript property objects. At least one expression containing at least one property object is evaluated to define at least one dependent property. When a property object changes state, the at least one dependent property is notified and the state of the at least one dependent property is updated based on the changed state of the property object.

Figure 1:
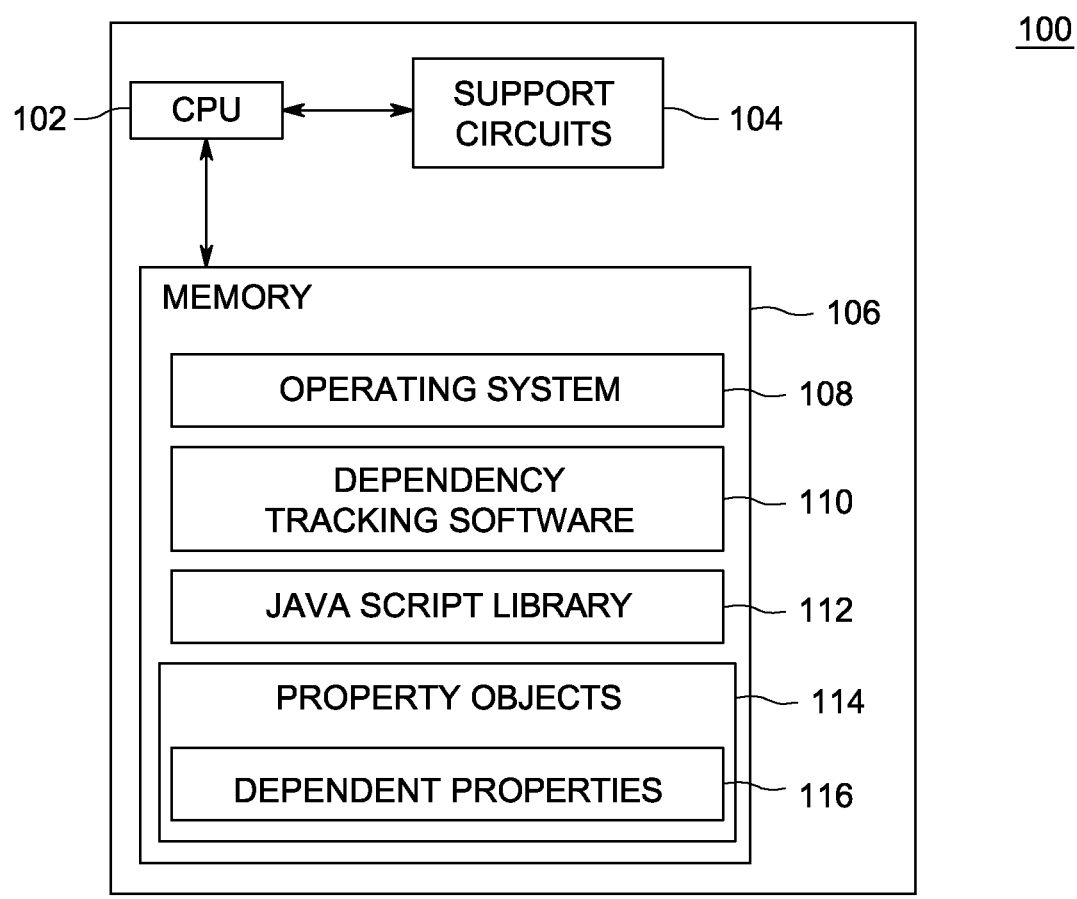
FIG. 1 depicts a computer system for property dependency tracking in Java Script, according to one or more embodiments.

While the method and apparatus is described herein by way of example for several embodiments and illustrative drawings, those skilled in the art will recognize that the method and apparatus for dependency tracking is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for dependency tracking as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for dependency tracking in JavaScript. In one embodiment, properties are defined as JavaScript objects. The embodiments leverage the JavaScript objects, so when, for example, in one embodiment, an expression reads "price*quantity", Javascript determines the expression is a multiplication expression. JavaScript coerces each of the objects in the expression. Type coercion is inherent in JavaScript. When JavaScript determines an expression is a mathematical expression, it inherently coerces the objects of the expression into numeric data types. The string value "5" will be coerced to become the number 5. It is then possible to evaluate them in mathematical expressions. For example, the price object and the quantity object are coerced using a valueOf( ) method which is a built-in JavaScript convention. However, if the objects were non-numeric, JavaScript would coerce the objects using the toString( ) method. Within the valueOf( ) and toString( ) methods, software code, shown below, is added for detecting dependencies. When property objects change state, the valueOf( ) or toString( ) method is called and the properties that reference them (called dependent properties) know to recalculate and update their current state. In other words, when a property object changes state, all of its dependent properties are notified and the state of each dependent property is automatically recalculated based on a new value. In one embodiment, for example, the property objects are price, quantity, subtotal, tax, shipping and grand total. "Price" and "quantity" are both referenced by the dependent properties "subtotal", "tax" and "shipping" because a change in price or quantity results in a change in those quantities. Grand total is further dependent upon subtotal, tax and shipping so when these values are recalculated, the grand total automatically recalculates. The Price*Quantity expression calls the price object and the quantity object. JavaScript coerces using the valueOf( ) method, and notifies the dependent properties "subtotal", "tax" and "shipping" of an update so they can be recalculated. Because the subtotal, tax and shipping are recalculated, and grand total is a dependent property of subtotal, tax, and shipping, the grand total is also automatically recalculated.

Various embodiments of an apparatus and method for dependency tracking in JavaScript are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for dependency tracking in JavaScript. Advantageously, embodiments provide a reliable dependency tracking algorithm having simple grammatical expressions and notification mechanisms. The algorithm results in calculated fields being automatically recalculated when fields on which they depend are updated without requiring extensive programming knowledge of the form's author.

FIG. 1 depicts a computer system 100 for dependency tracking in Java Script, according to one or more embodiments. The system 100 defines a plurality of properties as JavaScript objects and intercepts references to the plurality of property objects to define at least one dependent property. Further, the system 100 notifies the at least one dependent property when a state of the property object changes, and automatically updates the state of the at least one dependent property based on the changed property object.

The computer system 100 comprises a CPU 102, a memory 106, and support circuits 104. The computer system 100 is a type of computing device (e.g., a laptop, a desktop, a Personal Digital Assistant (PDA), a tablet, a mobile phone and/or the like) known to one of ordinary skill in the art. The CPU 102 may comprise one or more commercially available microprocessors or microcontrollers that facilitate data processing and storage. The various support circuits 104 facilitate the operation of the CPU 102 and include one or more clock circuits, power supplies, cache, input/output circuits, displays, and the like. The memory 106 comprises at least one of Read Only Memory (ROM), Random Access Memory (RAM), disk drive storage, optical storage, removable storage and/or the like. The memory 106 comprises an operating system (OS) 108, dependency tracking software 110, a Java script library 112, and property objects 114. The property objects 114 comprise dependent properties 116.

According to some embodiments, the operating system (OS) 108 generally manages various computer resources (e.g., network resources, data storage resources, file system resources and/or the like). The operating system 108 is configured to execute operations on one or more hardware and/or software modules, such as Network Interface Cards (NICs), hard disks, virtualization layers, firewalls and/or the like. For example, the dependency tracking software calls commands associated with the operating system 108 (i.e., native operating system commands) to perform various operations, such as accessing of JavaScript libraries, defining properties and/or the like.

According to some embodiments, the property objects 114 comprise one or more properties defined as JavaScript objects. The dependent properties 116 are those properties that are dependent upon the property objects 114, i.e., a dependent property 116 needs to be recalculated when there is a change to a property object 114 from which the dependent property depends.

A JavaScript library 112 is a library of pre-written JavaScript which allows for easier development of JavaScript-based applications. The JavaScript library 112 is accessed for one or more functions, such as "valueOf( )" and "toString( )", among others.

The following code illustrates an implementation of dependent tracking from within the valueOf( ) and toString( ) methods:

```
function Property (value) {
    this.valueOf = function( ) {
        //implement dependent tracking here
        return value;
    };
    this.toString = function( ) {
        //implement dependent tracking here
```

-continued

```
        return value.toString( );
    }
    this.$ set= function (newValue) {
        value = newValue;
        // notify dependents here
    }
}
```

The dependency tracking software 110 records the relationship between the property object and the at least one dependent property 116 that is notified when a state of the property object on which the property depends changes. The dependency tracking software updates the state of the at least one dependent property 116 based on the changed state of the property object.

Embodiments of the present invention may also be extended to allow tracking of array objects in addition to tracking of individual properties (as explained above). The system represents an array as a JavaScript object where the object has accessors that supports the same syntax as the JavaScript array:

```
function Collection (array) {
    for (var i=0; i<array.length; i++){
        this[i] = array[i]
    }
    //references to the length property will build dependent lists
    this.length = new Property (array.length);
    // mimic array.push( )
    this.push = function(obj) {
        array.push(obj);
        this[this.length.toString( )] = obj;
        // modify length will notify dependents
        this. length.$set(this.length +1 );
    }
    this...// define the rest of the array API
}
```

In a manner shown in the above example of partial code, an expression that iterates over the contents of an array is dependent on array length property. For example:

```
function calculate(details) {
var sum=0;
for (var i=0; i<details.length; i++) { // implicitly calls
details.length.valueOf( )
sum+=details[i].subtotal; // implicitly calls details[i].subtotal.valueOf( )
}
return sum;
}
```

When the above illustrated expression is evaluated for a total property, each "subtotal" property and the collection "length" object will include "total" in their dependent lists.

Figure 2:
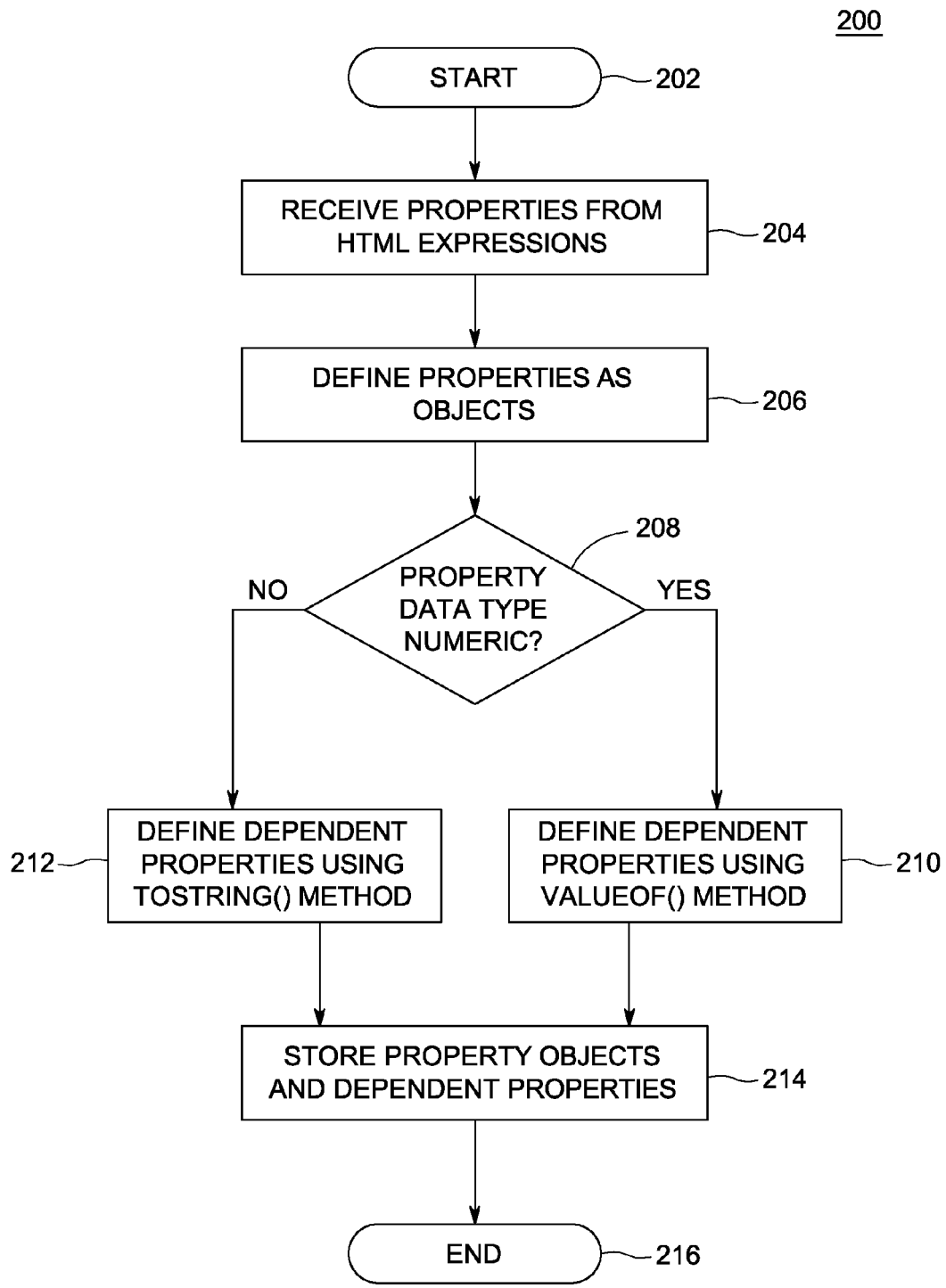
FIG. 2 depicts a flow diagram of a method of creating dependencies amongst properties as performed by the dependency tracking software of FIG. 1, according to one or more embodiments.

FIG. 2 depicts a flow diagram of a method 200 of creating dependencies amongst properties, as implemented by dependency tracking software 110 of FIG. 1, according to one or more embodiments. In one embodiment, for example, in an on-line shopping form the expression price*quantity is used to evaluate subtotal. The subtotal is used in one expression to determine sales tax and in another to determine the shipping charge. The expression subtotal+sales tax+shipping charge is used to evaluate the grand total. Hence, the price object and the quantity object have the dependent property "subtotal" because when the price or quantity objects have a change in value, the subtotal must be recalculated as well. Subtotal has the dependent properties "sales tax" and "shipping charge" because when the subtotal is recalculated, the sales tax and shipping charge must also be recalculated. Subtotal also has the dependent property "grand total" as do "sales tax" and "shipping charge" because when any of these values change, the grand total must be recalculated. The method 200 of FIG. 2 defines these dependencies.

The method 200 starts at step 202, and proceeds to step 204. At step 204, properties are received from HyperText Markup Language (HTML) expressions. The method 200 proceeds to step 206. At step 206, the properties are defined as JavaScript objects, hereafter, property objects. This is illustrated in the source code above. The method 200 proceeds to step 208. At step 208, the method 200 determines whether the data type of the property object is numeric. If the method 200 determines that the property data type is numeric, the method 200 proceeds to step 210. At step 210, the method 200 calls the property object and JavaScript coerces using the valueOf( ) method for the property object as illustrated in the source code above and creates a list of dependent properties for the property object. If the method 200 determines that the data type of the property object is not numeric, the method 200 proceeds to step 212. At step 212, the method 200 calls the property object and JavaScript coerces using the toString( ) method for the property object as illustrated in the source code above and creates a list of dependent properties for the property object. The method 200 proceeds to step 214. At step 214, the method 200 stores the property objects and the lists of dependent properties. The method 200 ends at step 216.

Figure 3:
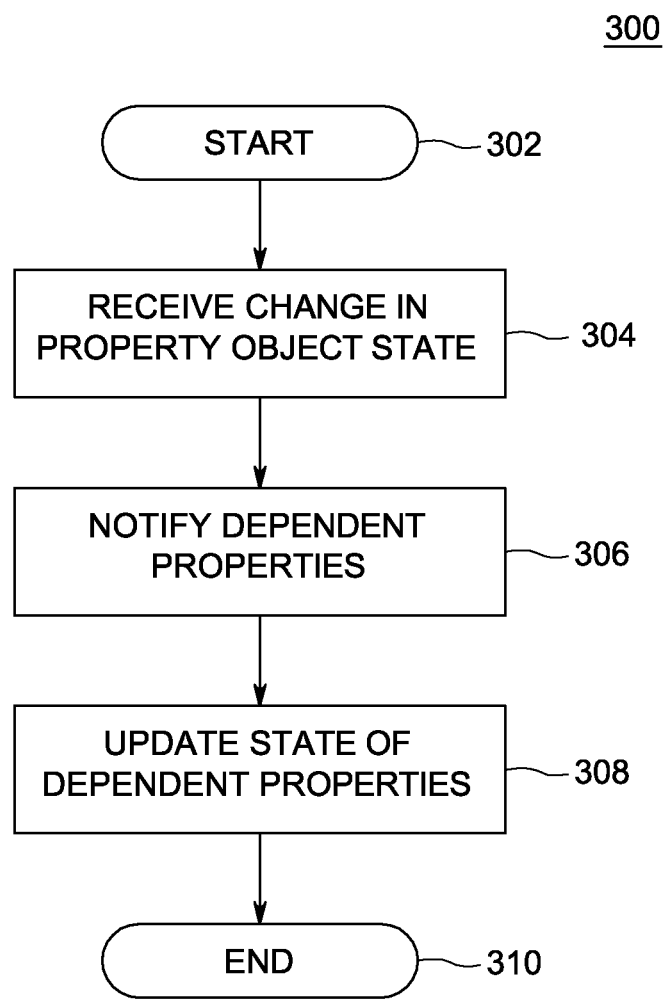
FIG. 3 depicts a flow diagram of a method for updating dependent properties as performed by the dependency tracking software of FIG. 1, according to one or more embodiments.

FIG. 3 depicts a flow diagram of a method 300 for updating a dependent property when there is a change to a property object from which it depends as performed by the dependency tracking software 110 of FIG. 1, according to one or more embodiments. The method 300 updates a property object's dependent properties when the value of a property object is changed. When the state (value) of a property object changes, all of its dependent properties are notified and the state of each dependent property is recalculated based on the property's new state (value).

The method 300 starts at step 302 and proceeds to step 304. At step 304, the method 300 receives a change in the state of a property object. In one embodiment, this entails a change in a text field or selection of a radio button on a form. The method 300 proceeds to step 306. At step 306, the method 300 refers to the list of dependent properties associated with the changed property object and notifies all of the dependent properties that there has been a change and they need to be recalculated. The method 300 proceeds to step 308. At step 308, the method 300 updates the value of each dependant property. In some embodiments, the method 300 updates the state by recalculating a numeric value for the dependent property i.e. the dependent properties based on a changed quantity in the updated property object. In some embodiments, the method 300 updates the state by refreshing a text string for the dependent property based on a changed text string in the updated property object. The method 300 ends at step 310.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
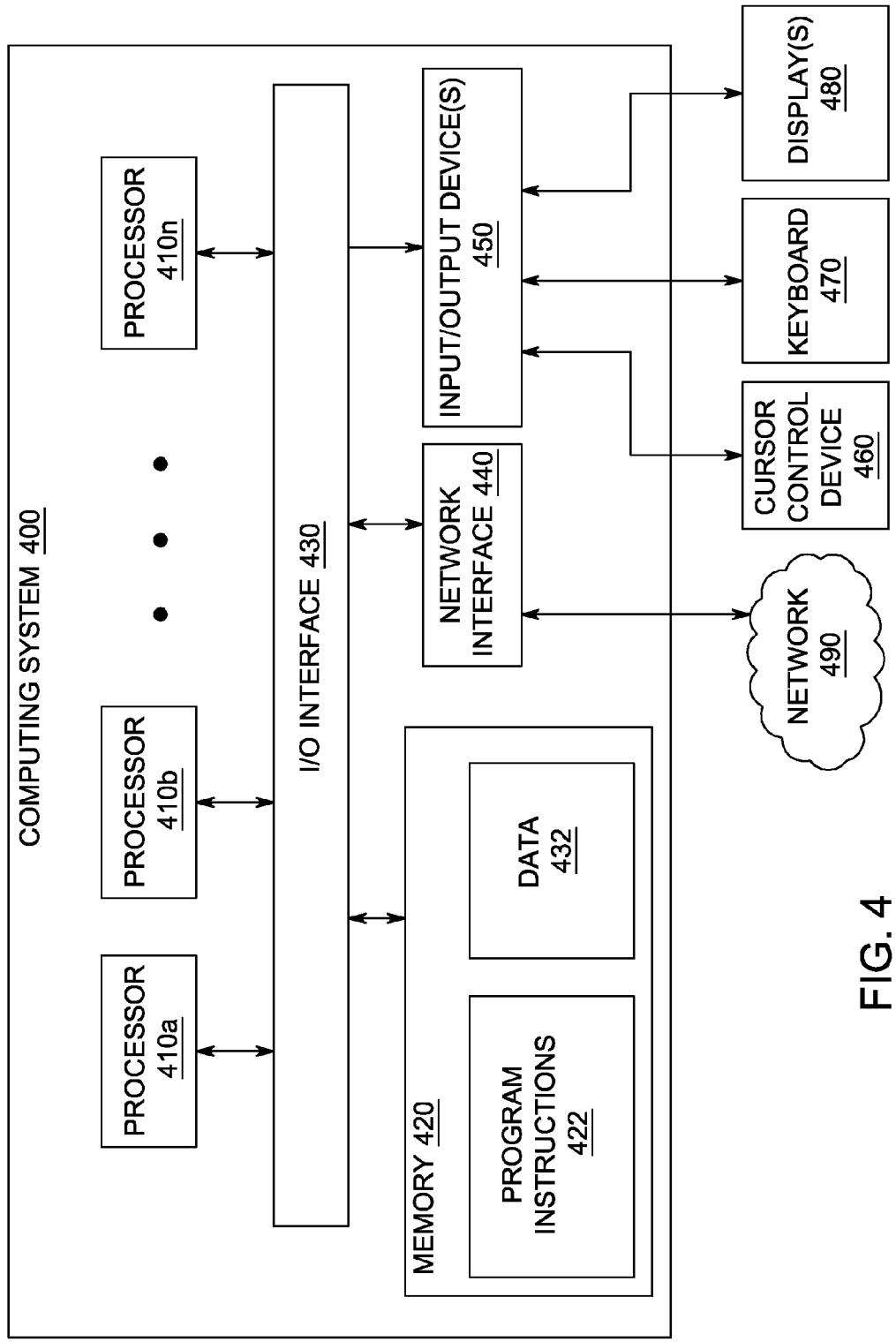
FIG. 4 depicts a computer system that can be used to implement the methods of FIGS. 2 and 3 of the present invention, according to one or more embodiments.

FIG. 4 depicts a computer system that can be utilized in various embodiments of the present invention, according to one or more embodiments.

Various embodiments of method and apparatus for dependency tracking in JavaScript, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIGS. 2-3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of dependency tracking in an object-oriented dynamic computer programming language comprising:

defining a plurality of properties as property objects in an object-oriented dynamic computer programming language;

creating a list of at least one dependent property by evaluating at least one expression containing at least one property object, wherein evaluating the at least one expression comprises determining whether or not the at least one expression is a mathematical expression, calling a valueOf( ) method when the at least one expression is determined to be a mathematical expression and calling a toString( ) method when the at least one expression is determined to be a non-mathematical expression;

referring to the list of at least one dependent property to identify the at least one dependent property when a state of the at least one property object changes;

notifying the at least one dependent property when the state of the at least one property object changes; and updating the state of the at least one dependent property based on the changed state of the at least one property object.

2. The method of claim 1, wherein the at least one expression includes a mathematical expression defining a data type of the at least one property object as numeric.

3. The method of claim 1, wherein the valueOf( ) method defines the at least one dependent property that requires recalculating when the at least one property object changes state.

4. The method of claim 3, wherein the at least one dependent property is stored with the at least one property object in the list of at least one dependent property, wherein each dependent property has a defined data type of numeric.

5. The method of claim 3, wherein notifying the at least one dependent property comprises accessing the list of at least one dependent property stored by the valueOf( ) method.

6. The method of claim 1, wherein the at least one expression includes a non-mathematical expression that defines a data type of the at least one property object as a text string.

7. The method of claim 1, wherein the toString( ) method defines the at least one dependent property that requires refreshing when the at least one property object changes state.

8. The method of claim 7 wherein the at least one dependent property is stored with the at least one property object in the list of at least one dependent property, wherein each dependent property has a defined data type of text string.

9. The method of claim 7, wherein notifying the at least one dependent property comprises accessing the list of at least one dependent property stored by the toString( ) method.

10. A non-transitory computer readable medium for storing computer instructions that, when executed by at least one processor cause the at least one processor to perform a method of dependency tracking comprising:

defining a plurality of properties as property objects in an object-oriented dynamic computer programming language;

creating a list of at least one dependent property by evaluating at least one expression containing at least one property object, wherein evaluating the at least one expression comprises determining whether or not the at least one expression is a mathematical expression, calling a valueOf( ) method when the at least one expression is determined to be a mathematical expression and calling a toString( ) method when the at least one expression is determined to be a non-mathematical expression;

referring to the list to identify the at least one dependent property when a state of the at least one property object changes;

notifying the at least one dependent property when the state of the at least one property object changes; and updating the state of the at least one dependent property based on the changed state of the at least one property object.

11. The computer readable medium of claim 10, wherein the at least one expression includes a mathematical expression defining a data type of the at least one property object as numeric.

12. The computer readable medium of claim 10, wherein the valueOf( ) method defines the at least one dependent property that requires recalculating when the at least one property object changes state.

13. The computer readable medium of claim 12, wherein the at least one dependent property is stored with the at least one property object in the list of at least one dependent property, wherein each dependent property has a defined data type of numeric.

14. The computer readable medium of claim 10, wherein the at least one expression includes a non-mathematical expression defining 1 data type of the at least one property object as a text string.

15. The computer readable medium of claim 10, wherein the toString( ) method defines the at least one dependent property that requires refreshing when the at least one property object changes state.

16. The computer readable medium of claim 15, wherein the at least one dependent property is stored with the at least one property object in the list of at least one dependent property, wherein each dependent property has a defined data type of text string.

* * * * *